Dec. 12, 1939.   L. V. UHRIG   2,183,126
BOREHOLE THERMOMETER
Filed June 11, 1938
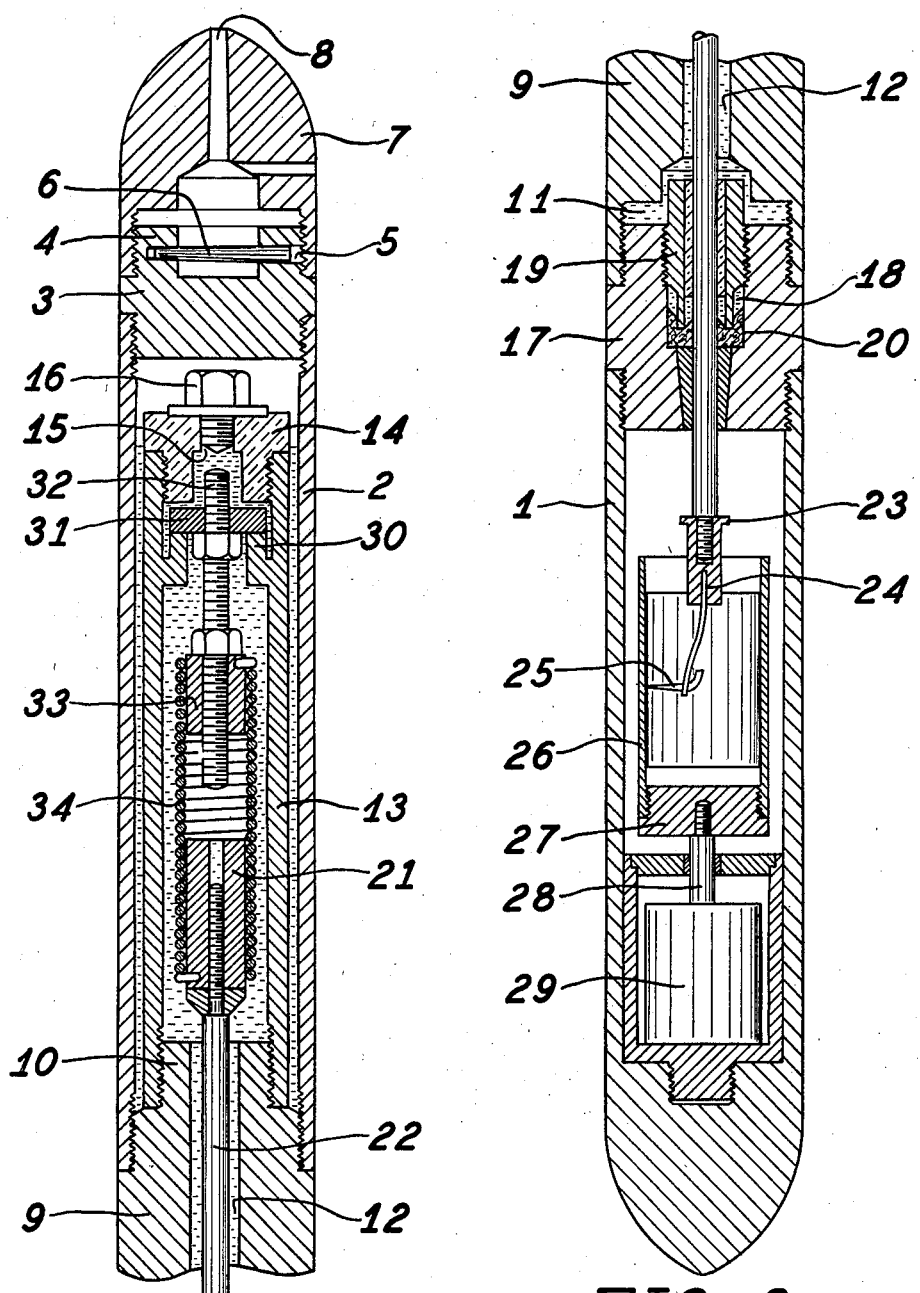
FIG_1   FIG_2
Leo Vernon Uhrig  INVENTOR.
BY
ATTORNEY.

Patented Dec. 12, 1939

2,183,126

UNITED STATES PATENT OFFICE 2,183,126

BOREHOLE THERMOMETER

Leo V. Uhrig, Houston, Tex., assignor to Standard Oil Development Company, a corporation of Delaware Application June 11, 1938, Serial No. 213,119

2 Claims. (Cl. 73—369)

The present invention is directed to a thermometer for use in boreholes, and especially adapted for the measurement of temperatures in boreholes drilled for the production of petroleum oil.

The principal object of the present invention is the provision of a thermometer of the character described which shall be rugged, relatively simple in construction and sensitive to the desired degree of accuracy.

An additional object of the present invention is the provision of a thermometer of the character described employing mercury or a similar heat sensitive fluid as a medium for indicating changes of temperature by changes in volume, and provided with means for eliminating the effect of borehole pressures on the temperatures recorded.

Further objects and advantages of the present invention will appear from the following detailed description of the accompanying drawing, in which—

Figure 1 is a longitudinal section through the upper portion of the thermometer of the present invention; and Figure 2 is a longitudinal section through the lower section of said thermometer.

Referring to the drawing in detail, the thermometer is made in the form of a long cylindrical bomb which has two main interior chambers, the one being housed by casing 1 and the other being housed by the casing 2. Within casing 1 is mounted the recording chart together with the mechanism necessary to operate it. Within casing 2 is mounted the mechanism for operating the stylus employed to record temperatures on the chart contained in casing 1.

Casing 2 is an open ended cylinder interiorly threaded on both ends. Screwed into one end of casing 2 is a plug 3 provided on its other end with a cup-shaped projection 4 which is exteriorly threaded and is provided with diametrically opposed slots 5 to receive a pin 6 on which may be secured a wire line for lowering the instrument into the borehole. Screwed onto the cup-shaped member 4 is a cap 7 provided with a longitudinal passage 8 through which the wire line may be passed.

Screwed into the other end of chamber 2 is a plug 9 which is provided on one of its ends with an exteriorly threaded stud 10 projecting into casing 2 and at its other end with a recess 11, the walls of which are interiorly threaded. An axial passage 12 runs through the plug 9.

Screw-threaded on the stud 10 is another casing 13 of smaller external diameter than the internal diameter of casing 2, whereby an annular space is provided between the two casings. The other end of casing 13 is closed by a cap 14 which has a central opening 15 closed by a nut 16.

A sleeve 17, threaded externally at both ends and internally at its inner end, is screwed into the cavity in the end of plug 9. The sleeve has a central bore 18 which is enlarged at the end which is interiorly threaded to receive a nut 19 the purpose of which is to secure against the annular surface formed inside the sleeve by the widening of its internal passage a packing member 20 provided with a central opening. The other exteriorly threaded end of sleeve 17 is screwed into casing 1.

Mounted in the interior of casing 13 is a piston 21 having a rod 22 which passes through the axial passage in plug 9, nut 19, through the central opening in packing 20 and the passage through sleeve 17, into the interior of chamber 1. Screw-threaded on the end of the piston rod in chamber 1 is a stud 23 provided with an axial recess 24 adapted to receive a stylus 25 which is adjusted to write on the surface of the record strip lined on the interior of cylinder 26 carried by a block 27 which is rotated by a shaft 28 operated by a clock-work 29.

Casing 13 has an interior shoulder 30 spaced from its threaded end which receives cap 14. Arranged in between this shoulder and the inner end of cap 14 is a nut 31 carried by a bolt 32 which also carries a threaded sleeve 33. Anchored on the sleeve 33 and on the piston 21 is a tension spring 34. This spring is so adjusted as to hold the stylus at zero position which may be any given temperature which may be selected as the starting point. The spring also insures that the piston will be drawn back toward its zero position when an elevation in temperature which causes the piston to move outwardly has subsided.

Casing 13 is completely filled with mercury, including the passage in plug 9, and all of the cavities back of the packing gland 20. The chamber is filled through opening 15. The annular space between chamber 13 and chamber 2 is also filled with mercury preferably to a point near the upper end of casing 13. It will be noted that clearance is provided between the end of cap 14 and the inner end of plug 3, forming a chamber which is adapted to receive the overflow of mercury from the annular space between chamber 13 and chamber 2. The purpose of the mercury in this annular space is to take up the pressure which is exerted on the external wall of chamber 2 thereby preventing this pressure from effecting any change in the volume of chamber 13. In order to acquire the proper sensitivity it is necessary to make the walls of chambers 2 and 13 fairly thin so that, without some compensating arrangement, the high pressure encountered in oil wells might change the interior volume of casing 13. This pressure compensation could be provided without the introduction of mercury into the aforesaid annular space, but this would leave an air space which, because of the poor conductive properties of air, would reduce the sensitivity of the thermometer. This is avoided by using mercury in the annular space.

It is to be understood that the above described arrangement of parts constitutes only one embodiment of the present invention. Changes may be made in the construction of this arrangement without departing from the scope of the present invention, and such changes as are within the skill of the experts in this art are contemplated. The scope of the present invention is defined in the appended claims in which it is intended to be claimed as broadly as the prior art permits.

I claim:

1. A borehole thermometer comprising a recording chamber and a measuring chamber sealed from each other, an inner chamber in said measuring chamber having its walls spaced from the walls of the measuring chamber, a heat sensitive fluid filling said inner chamber, a piston arranged in said inner chamber, a rod connected to said piston passing into the recording chamber, and a heat sensitive fluid in the annular space between the wall of the measuring chamber and the wall of the inner chamber.

2. A borehole thermometer comprising a recording chamber and a measuring chamber aligned with each other and sealed from each other, an inner chamber in said measuring chamber concentric therewith and of shorter length and of an external diameter smaller than the internal diameter of the measuring chamber, a piston arranged in said inner chamber, a heat sensitive fluid completely filling said inner chamber, a rod on said piston extending into said recording chamber, and a heat sensitive liquid arranged in the annular space between the wall of said inner chamber and the wall of said measuring chamber.

LEO V. UHRIG.